United States Patent [19]

Crudden et al.

[11] 4,399,966

[45] Aug. 23, 1983

[54] POWER OPENING SYSTEM FOR ENGINE COWL DOORS

[75] Inventors: Eric H. Crudden, Mercer Island; P. Jay Jessen, Snohomish, both of Wash.

[73] Assignee: The Boeing Company, Seattle, Wash.

[21] Appl. No.: 221,827

[22] Filed: Dec. 31, 1980

[51] Int. Cl.³ .............................................. B64C 1/14
[52] U.S. Cl. ................................ 244/129.4; 244/53 R
[58] Field of Search ............ 244/53, 54, 129.4, 129.5; 114/35, 36, 201 R, 201 A; 60/60, 39.31, 226 A, 226 R; 49/340, 357

[56] References Cited

U.S. PATENT DOCUMENTS

| 2,077,957 | 4/1937 | Schnell ................................... 49/340 |
| 2,178,998 | 11/1939 | Scott ....................................... 244/53 |
| 2,551,239 | 5/1951 | Bond ....................................... 49/340 |
| 2,773,353 | 12/1956 | Oishei ...................................... 60/60 |
| 2,783,003 | 2/1957 | Ralson et al. ...................... 60/39.31 |
| 3,257,757 | 6/1966 | Bedard ................................... 49/357 |
| 3,344,555 | 10/1967 | Hugle ..................................... 49/340 |
| 3,511,055 | 5/1970 | Timms ............................... 60/226 A |
| 3,541,794 | 11/1970 | Johnston et al. ................... 60/39.31 |
| 4,044,973 | 8/1977 | Moorehead ........................ 60/39.31 |

OTHER PUBLICATIONS

Galy, C. D. "Airbus Hydraulic Power Always Available" *Hydraulics & Pneumatics*; vol. 25, No. 12, Dec. 1972, pp. 57–60.

*Primary Examiner*—Trygve M. Blix
*Assistant Examiner*—Jesus D. Sotelo
*Attorney, Agent, or Firm*—Christensen, O'Connor, Johnson & Kindness

[57] ABSTRACT

A self-contained apparatus for moving the portions of a cowl covering the gas-generator portion of a turbofan jet engine includes a motor-driven pump for pumping hydraulic fluid from a reservoir mounted on the engine through a control circuit which selectively channels the fluid to actuators associated with each of the cowl portions to move the cowl portions to their desired positions. The hydraulic control circuit preferably includes solenoid-actuated valves associated with each of the actuators and operable to selectively permit flow of fluid into and out of the actuators as is desired to open and close the cowl portions. Another solenoid valve is provided to control passage of the fluid from the actuators back to the reservoir during the closing of the cowl portions. The speed of closure of the cowl portions is regulated by one-way flow restrictors in the outlet ports of the actuators that control the rate of flow of fluid out of the actuator. A manual drive is provided for the pump and is operable to permit actuation of the cowl moving apparatus during periods of power loss or motor failure.

8 Claims, 3 Drawing Figures

POWER OPENING SYSTEM FOR ENGINE COWL DOORS

BACKGROUND OF THE INVENTION

This invention relates to jet aircraft engines and, more particularly, to self-contained apparatus mounted directly on the engine for raising and lowering the engine cowl sections to allow access to the workings of the engine by maintenance personnel.

In commercial aircraft having jet engines, it is oftentimes necessary to perform maintenance and repair work on the engine during stopovers along the flight route of the aircraft. Most jet engine cowlings are constructed as two bifurcated half cylinders hingedly attached to the engine or mounting strut so that they can be pivoted upwardly away from the engine core to permit maintenance personnel to access the engine core. Present devices used for opening the cowl halves or "D-ducts," as they are known in the industry, are either mechanical screw devices which have poor reliability or hydraulic actuators which are operated with a separate hand pump. In most cases in which the hand pump is used, one of the pumps is stowed on the aircraft so that it is available for use if necessary when the aircraft is on the ground. Since the pump is a separate article from the actuator, it is never certain that the ground station at which the plane is stopping en route has a pump available for use by the aircraft. In the hand pump system the hydraulic fluid for the actuator is contained within the pump itself and then pumped into the actuator during operation of the pump. After maintenance is performed and the cowl D-duct is closed, the hydraulic fluid is removed from the actuator and stored in the hand pump. The oil capacity of the hand pump limits the number of engine doors which can be opened at any given time and on multiengine aircraft it is seldom possible to have all the engines exposed for maintenance simultaneously. Also, there is practically no backup means available to open the cowl doors in case of failure of the hand pump or loss of the pump by ground personnel or misplacement of the hand pump aboard the aircraft.

It is therefore an object of the present invention to provide an apparatus for opening and closing the engine cowl halves covering the engines on a jet airplane that is self-contained and easily mountable on or adjacent the engine.

It is a further object to provide such an opening and closing apparatus which is relatively light and compact and which can open the cowl without regard to the condition of the remaining cowls on the other aircraft engines.

It is another object of this invention to provide such a self-contained opening and closing apparatus which has a high mechanical reliability and which is power-driven to permit easy opening of the heavy cowl doors and which has a backup source of manual drive in the event of failure of the power drive unit or power supply.

SUMMARY OF THE INVENTION

In accordance with the foregoing objects, and in connection with a jet engine having a bifurcated cowl an apparatus for opening and closing the cowl halves includes a power unit mounted on or adjacent to the jet engine. The power unit is connected to two hydraulic actuators each of which is mounted between fixed structure and one of the hinged cowl halves. Extension of one of the actuators by the power unit causes its associated bifurcated cowl half to swing to an open position spaced from the engine where it is held by the extended actuator.

The power unit includes a reservoir of hydraulic fluid and suitable valving to selectively permit flow of the fluid to the actuators to cause extension of the actuators. An electrically-driven pump is provided to pump the fluid from the reservoir through the valving and into the actuators. Upon retraction of the actuators under the weight of the cowl doors the fluid is guided back to the reservoir for reuse. A manual drive crank is provided, coupled to the pump through a selective coupling which permits the pump to be driven by the manual crank as an alternative to the electric drive. The manual crank provides an emergency backup to operate the pump in the event of an electrical drive or power failure. Preferably, the valves used to control the extension and retraction of the actuators are solenoid valves remotely controlled from a location on or near the engine. The valves also include manual position selection features that allow their operation in the event of an electrical power failure.

BRIEF DESCRIPTION OF THE DRAWINGS

The invention disclosed herein will be better understood by those of ordinary skill in the art and others upon reading the ensuing specification taken in conjunction with the attached drawings wherein.

DETAILED DESCRIPTION OF THE PREFERRED EMBODIMENT

Figure 2:
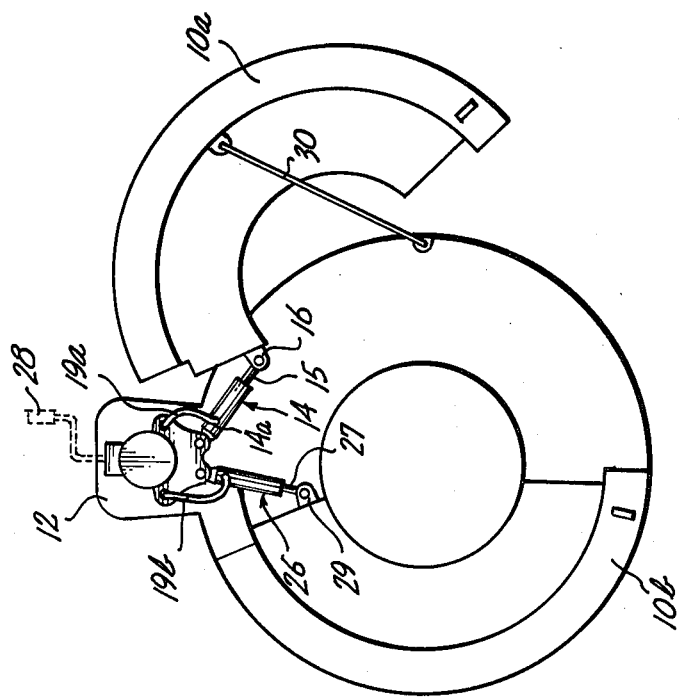
FIG. 2 is a front elevational view of the jet aircraft engine of FIG. 1 with one of the cowl halves in the open position.
Figure 1:
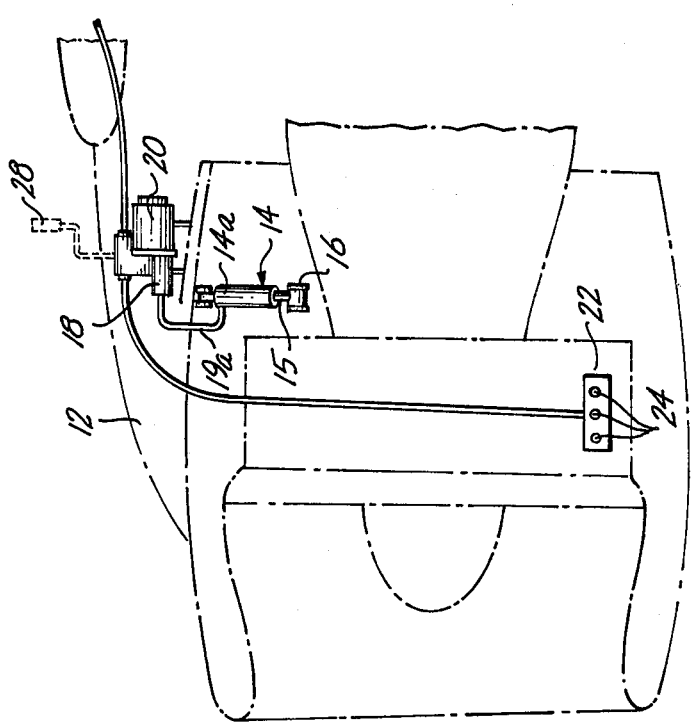
FIG. 1 is a side elevational view with portions removed of a jet aircraft engine having a cowl opening apparatus made in accordance with the principles of the present invention mounted thereon.

Referring now to FIGS. 1 and 2, a conventional turbofan jet engine is shown in general outline. The fan portion of the engine is surrounded by a substantially annular cowl structure which is longitudinally bifurcated along its lowermost portion to form two semicircular cowl sections 10a and 10b. The cowl sections 10a and 10b are hinged to the engine supports adjacent their upper edge so that the cowl sections can be swung away from the engine core to expose the core to maintenance personnel. In accordance with the principles of the present invention, an apparatus for opening the cowl halves is mounted on the engine in proximity to the engine mounting strut 12. A hydraulically operated linear actuator 14 is coupled at a first end thereof to an actuator bracket and is kept stationary with respect to the engine mounting strut. The actuator 14 further includes an extensible rod 15 slidably mounted within the cylinder 14a and protruding from a second end of the cylinder. The end of the extensible rod 15 protruding from the cylinder 14a is coupled to a bracket 16 affixed to the cowl section 10a adjacent the upper portion thereof and at a location offset from the hinge line of the cowl section. As hydraulic fluid is injected into the cylinder 14a through line 19a, the magnitude of extension of extensible rod 15 from the cylinder increases to pivot the cowl section 10a about its hinge line to space the cowl section from the engine and expose the engine core. The hydraulic fluid is pumped from a reservoir by hydraulic pump 18, mounted on the engine adjacent the strut. The hydraulic pump 18 is preferably driven by an electric motor 20. As the hydraulic fluid flows from the reservoir to the actuator, it passes through a series of control valves which are utilized to control the opening and closing of the cowl sections and which will be described in greater detail below. A control panel 22 mounted in the lower portion of the engine contains switches 24 which control the aforementioned valves, thereby controlling the movement of the cowl sections. A second actuator 26 is provided to open the other cowl portion 10b and is mounted in similar fashion as the first actuator 14, however, the extensible rod 27 of the second actuator is pivotally connected at a first end thereof to a bracket 29 affixed to the cowl section 10b to open and close that cowl section. Hydraulic fluid to operate the second actuator 26 comes from the common reservoir and is pumped by the hydraulic pump 18 through a hydraulic line 19b to the cylinder 26a of the second actuator 26. The operator can select which of the first or second cowl portions 10a or 10b is moved by selective actuation of the switches 24 located on the control panel 22. Preferably, the cowl sections can be opened and closed independently of one another or can be opened and closed simultaneously depending on the switch selection.

In case of failure of the electric motor 20 or lack of a source of electricity to run the electric motor, a manual drive is provided for the hydraulic pump 18 and is actuated through means of the manual crank 28 which will be described in greater detail below.

Although in the preferred embodiment the control valve system for raising and lowering the cowl door is designed to maintain the cowl door in any position desired by means of hydraulic pressure in the valve system, it may be desirable during maintenance on the engine core to provide a rigid hold-open rod 30 which can be inserted between the engine core and the open cowl section as a safety feature to ensure that the cowl door remains in the open position during maintenance work.

Figure 3:
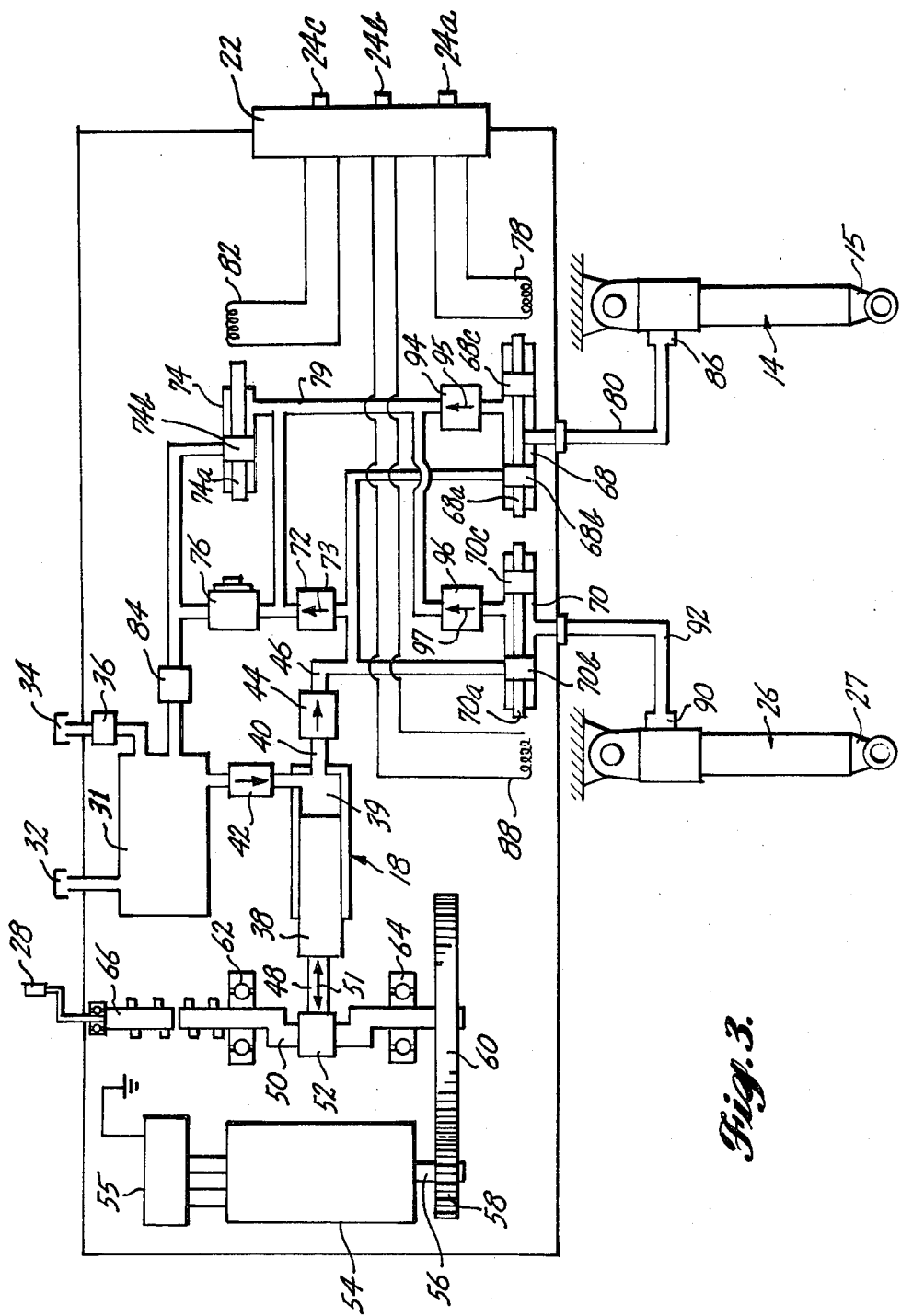
FIG. 3 is a schematic diagram of a hydraulic circuit made in accordance with the principles of the present invention.

Referring now to FIG. 3, the hydraulic control circuit for controlling operation of the first and second actuators 14 and 26 is shown in greater detail. A reservoir 31 contains the hydraulic fluid used in the actuation system. A conventional breather pipe 32 is coupled to the reservoir as well as a fill pipe 34. A filter 36 is installed in the fill line to filter impurities out of the hydraulic fluid during refill of the reservoir. The hydraulic pump 18 preferably comprises a positive displacement, single cylinder/piston assembly. As the piston 38 moves to the left, as viewed in FIG. 3, it draws fluid from the reservoir 31. On the exhaust stroke, i.e., when the piston 38 moves to the right, as viewed in FIG. 3, the fluid which has been drawn from the reservoir 31 is exhausted through hydraulic line 40 into the remainder of the control circuit. A check valve 42 is inserted in the hydraulic line between the reservoir 31 and the pump cylinder 39 to prevent flow of the fluid back into the reservoir on the exhaust stroke of the pump. The check valve 44 placed in hydraulic line 40 permits flow of hydraulic fluid from the pump cylinder 39 to the hydraulic system but prevents return of fluid to the pump from the hydraulic line 46.

The pump piston 38 is driven through piston rod 48 affixed at a first end thereof to the end of piston 38. The second end of the piston rod 48 is coupled to crankshaft 50 by means of a collar 52. The crankshaft 50 is designed so that upon rotation of the crankshaft the piston rod 48 moves back and forth as shown by the arrow 51, carrying with it the piston 38, thereby producing the suction and exhaust strokes of the piston 38 to draw fluid from the reservoir 31 and force fluid into the hydraulic control circuit.

In its primary mode of operation the crankshaft 50 is driven by an electric motor 54 coupled to a source of electric power through interconnection box 55. Preferably, the motor is a three-phase AC-type motor capable of operation off of the normal AC current provided by an aircraft source. Preferably, the motor shaft 56 is drivingly coupled to a drive gear 58 which in turn drivingly engages a reduction gear 60, coupled to the crankshaft 50 such that rotation of the motor shaft 56 causes rotation of the drive gear 58 which in turn rotates the reduction gear 60, thereby inducing rotation of the crankshaft 50. In the preferred embodiment the electric motor is a 115 volt AC three-phase 400 Hertz induction motor having a synchronous speed of 8,000 r.p.m. and a full load speed of 7,200/7,400 r.p.m. delivering 0.4 horsepower for a five-minute rating. To provide the required pump speed, the unit employs straight spur reduction gears manufactured of nitrited steel to give good wear characteristics to the gear teeth. Preferably, the drive gear is a twelve-tooth pinion gear which drives a 127-tooth reduction gear 60 to give a reduction ratio of 10.58-to-1 and therefore a pump speed of 680 r.p.m. at 7,200 r.p.m. motor speed. The crankshaft 50 is mounted in a pair of suitable, conventional bearings 62 and 64 which permit smooth rotation of the crankshaft and inhibit lateral vibration. In the illustrated embodiment the manual crank 28 is coupled to an auxiliary drive shaft 66 which in turn is coupled to the end of the crankshaft 50 through a slip coupling. In the event of a power failure or failure of the electric motor 54, the slip coupling can be engaged to provide a driving coupling between the drive shaft 66 and the crankshaft 55. The hand crank 28 will then drive the crankshaft 50 and in turn operate the pump 18 to provide hydraulic fluid to the control system to operate the actuators 14 and 26 to open the cowl doors. While a hand crank 28 is illustrated, it is contemplated that the auxiliary drive shaft 66 could also be adapted for connection to a pneumatic or electric drill motor or other power tool and operation of the system could be maintained by use of such a drill motor or power tool, rather than a hand crank.

The flow of hydraulic fluid into and out of the hydraulic actuator 14 is controlled by a valve 68. Likewise, the flow of hydraulic fluid from and to the hydraulic actuator 26 is controlled by a valve 70. The valves 68 and 70 are preferably solenoid-actuated valves and are shown in FIG. 3 in a condition in which the solenoid is deenergized. The valve 68 includes a body having an axial bore formed therein. The valve 68 further includes an inlet port, outlet port and service port found in the body of the valve and communicating with the bore. A spool 68a is slidably mounted within the valve bore. The spool 68a has a first land 68b and a second land 68c formed thereon. In the solenoid deenergized condition, the first land 68b blocks the inlet port of the valve 68, preventing fluid from passing to the bore of the valve, thereby preventing fluid from passing to the hydraulic actuator 14.

Similarly, the valve 70 includes a body having an axial bore formed therein. The body has an inlet port, an exhaust port and a service port formed therein in fluid communication with said axial bore. A spool 70a is slidably mounted within the bore and has a first land 70b and a second land 70c formed thereon. In the solenoid deenergized position illustrated, the first land 70b blocks the inlet port, thereby preventing fluid from passing through the valve to the linear actuator 26.

The fluid, blocked at the inlet ports of the valves 68 and 70 is directed through a check valve 72, as indicated by arrow 73, to the inlet port of a third solenoid valve 74. The third solenoid valve 74 includes a valve body having an axial bore formed therein. The inlet port and an outlet port are formed through the valve body and open to the bore. A valve spool 74a slidably mounted within the bore has a land 74b formed thereon which blocks the outlet port of the valve in the illustrated solenoid deenergized position thereby preventing passage of the fluid through the third valve. From check valve 72, the fluid is also directed to a pressure relief valve 76 which permits flow through it when the pressure of the hydraulic fluid exceeds a predetermined pressure. From the pressure relief valve 76 the fluid flows back to the reservoir 31, first passing through a filter 84 to remove any impurities which may have been imparted to the fluid.

The coils 78, 88 and 82 associated with the first, second and third solenoid valves, respectively, are connected to a conventional switching circuit (not shown) in control panel 22. The control panel 22 either contains or is connected to a source of D.C. power which is selectively routed to the coils by means of switches 24a, 24b and 24c to selectively energize the solenoid valves. If it is desired to extend the extensible rod 15 to move the right-hand cowl portion 10a to the open position, the switch 24a is closed, providing current to flow through the coil 78 associated with the first solenoid valve 68 to move the valve spool 68a to the left, as viewed in FIG. 3, thereby permitting hydraulic fluid to flow into the inlet port of the first solenoid valve 68 and through the outlet port to the hydraulic actuator 14. When the cowl portion 10a has reached the desired position, the switch 24a released, deenergizing the coil 78, thereby causing the valve spool 68a to move back into its original position, cutting off the flow of fluid into the solenoid valve 68. The weight of the cowl door tends to force the extensible rod 15 back into the hydraulic actuator cylinder and tends to force the hydraulic fluid out of the exhaust port of the valve 68 back to the reservoir 31. However, the third solenoid 74, shown in the position it maintains when coil 82 is deenergized, blocks the flow of fluid back to the reservoir 31 so that the fluid is maintained in the hydraulic lines 79 and 80. The incompressible fluid therefore maintains the cowl door in its open position. The relief valve 76 is chosen so that its relief pressure is not exceeded by the pressure created by the weight of the cowl portions. If it is desired to close the cowl portion, the pushbutton switch 24c is depressed to close the switch and route current to the coil 82, thereby energizing coil 82 and moving the spool 74a to the left, as viewed in FIG. 3, opening the exhaust port of the valve 74, permitting fluid to flow back to the reservoir 31. The weight of the cowl door is then able to force the extensible rod 15 back into the actuator cylinder 14a as the hydraulic fluid flows back into the reservoir 31 permitting the cowl portion to close. The speed at which the cowl portion closes is determined by the rate of flow of hydraulic fluid from the actuator 14. An orifice-type flow restrictor 86 is installed at the outlet of the actuator cylinder in the hydraulic line 80 to restrict the flow of hydraulic fluid from the actuator back to the reservoir, thereby controlling the speed of closing of the cowl portion.

In a similar manner, the left-hand cowl portion 10b is opened by extension of the extensible rod 27 from actuator cylinder 26a. In order to accomplish the extension of rod 27, the switch 24b is closed, energizing the coil 88 associated with the second solenoid valve 70, thereby moving the valve spool 20a to the left to permit hydraulic fluid to flow into and through the second solenoid valve 70 to the hydraulic actuator 26 to extend the rod 27, thereby opening the left-hand cowl door.

The closing of the cowl portion 10b is accomplished in the same manner as was described for the right-hand cowl portion 10a. By releasing the switch 24b and closing the switch 24c the weight of the cowl portion 10b forces the rod 27 back into the actuator cylinder 26a. Fluid is thereby forced from the actuator cylinder 26 back through the exhaust port of the second solenoid valve 70 through the solenoid valve 74 back to the reservoir 30. A second flow restrictor 90 is installed in the hydraulic line 92 to control the rate of flow of hydraulic fluid from the actuator 26 back to the reservoir 31, thereby controlling the rate at which the cowl portion 10b closes.

It should be noted that both cowl portion 10a and 10b can be opened simultaneously by simultaneously closing the switches 24a and 24b, thereby simultaneously energizing the coils 78 and 88. Since the pump 18 supplies fluid to the control system at a constant rate, simultaneous actuation of the valves 70 and 68 will increase the time it takes to open the cowl portion since the total amount of fluid exiting pump 18 must be split between the actuator 26 and the actuator 14. Likewise, simultaneous closure of both cowl door halves will result in a slower closure speed due to the restrictions of flow through the valve 74 back to the reservoir 31. Check valve 94 is installed in the hydraulic line downstream of the exhaust port of the first solenoid valve 68 and an identical check valve 96 is installed downstream of the exhaust port of the second solenoid valve 70 to provide safeguards against crossflow of hydraulic fluid between the actuators under certain selection conditions when one actuator is extended and the other retracted. The direction of flow through the check valves 94 and 96 is in a direction away from their respective valve exhaust ports as shown by arrows 95 and 97. Preferably, each of the solenoid valves 68, 70 and 74 is of the type having a manual override which permits the manual placement of the valve into any desired position in the event of power failure or solenoid failure so that the cowl doors can be opened in a purely manual mode by placing the valves manually in the desired position and manually operating the crankshaft 50 through crank 28 in order to pump fluid from the reservoir 31 into the hydraulic control circuit.

In summary therefore, an apparatus for opening and closing the cowl sections covering the gas generator portion of a turbofan jet engine is provided. The mechanism is a self-contained apparatus which is easily mountable in close proximity to the engine mounting strut and permits actuation and movement of the cowl sections independently of one another or simultaneously, as is desired. The apparatus includes a motor-driven pump which pumps hydraulic fluid through a control circuit which selectively channels the fluid into the actuators associated with each of the cowl sections to move the cowl sections into the desired position. The control circuit preferably includes solenoid-actuated valves associated with each of the hydraulic actuators and operable to selectively permit the flow of fluid into and out of the cylinders of the actuators, as is desired to open and close the cowl portions. A third solenoid-actuated valve is provided to control the flow of fluid from the actuators back to a reservoir during closing of the cowl sections. The sections close under their own weight when the third solenoid valve is energized and the speed of closure is determined by the rate of flow of fluid from the actuator cylinder. Preferably the flow of fluid from the actuator cylinder is controlled by a restrictor placed in the fluid line between the actuator cylinder and the third solenoid valve. Preferably, each of the solenoid valves has a manual override which permits its operation by hand in the event of a power failure or solenoid failure. An alternative manual drive for the hydraulic pump is also provided to permit actuation of the cowl section opening system in the absence of electrical power to the motor-driven pump.

When a preferred embodiment of the invention has been described and illustrated herein, it will be apparent to those of ordinary skill in the art and others that several modifications can be made to the door opening system without affecting either the spirit or scope of the present invention. The illustrated and described embodiment is to be considered as exemplary only and the invention itself should be evaluated only as defined in the claims which follow.

The embodiments of the invention in which an exclusive property or privilege is claimed are defined as follows:

1. In an aircraft having a jet engine, said engine having an annular cowl covering at least a portion of said engine, said cowl being longitudinally bifurcated to form first and second cowl portions, each of said cowl portions being hingedly attached to said engine for swinging movement of each of said cowl portions between a first position in which said cowl portions are joined together and a second position in which said cowl portions are spaced from said engine to expose said portion of said engine, an apparatus for moving said cowl portions between their respective first and second positions comprising:

a first linear hydraulic actuator associated with said engine and said first cowl portion and operable to move said first cowl portion from its first position to its second position;

a second linear hydraulic actuator associated with said engine and said second cowl portion and operable to move said second cowl portion from its first position to its second position;

hydraulic fluid reservoir means mounted on said engine for supplying hydraulic fluid to said actuators;

hydraulic control means associated with said hydraulic fluid reservoir means and said linear hydraulic actuators and selectively operable to direct fluid from said reservoir means to said actuators, said hydraulic control means including first valve means associated with said first linear hydraulic actuator, said first valve means selectively operable in a first mode to pass hydraulic fluid from said reservoir means to said first actuator and in a second mode to pass hydraulic fluid from said first actuator to said reservoir means, second valve means associated with said second linear hydraulic actuator, said second valve means being selectively operable in a first mode to pass fluid from said reservoir means to said second actuator and operable in a second mode to pass fluid from said second actuator to said reservoir means, third valve means associated with said first and second linear hydraulic actuators and said reservoir means and selectively operable in a first mode to block the passage of hydraulic fluid from said actuators to said reservoir means and operable in the second mode to pass fluid from said actuators to said reservoir means; and hydraulic pump means mounted on said engine, said pump means having a suction and an exhaust, said suction being in fluid communication with said reservoir means and said exhaust being in fluid communication with said hydraulic control means.

2. The cowl moving apparatus of claim 1 further including electric motor means drivingly coupled to said hydraulic pump means for driving said hydraulic pump means, and manual override means associated with said hydraulic pump means and selectively operable to drive said hydraulic pump means as an alternative to said electric motor means.

3. The cowl moving apparatus of claim 1 wherein said first, second and third valve means are solenoid-actuated valves.

4. The cowl moving apparatus of claim 3 wherein each of said solenoid-actuated valves includes manual override means for manually positioning said valves between said first mode and said second mode of operation.

5. The cowl moving apparatus of claim 1 further including first and second flow resistor means respectively associated with said first and second hydraulic actuators, said flow restrictor means being operable to restrict the flow of hydraulic fluid out of said actuators while permitting free flow of fluid into said actuators.

6. The cowl moving apparatus of claim 1 wherein said first and second hydraulic actuators are linear actuators including:

a hydraulic cylinder for receiving hydraulic fluid; and, a rigid rod slidably mounted within said cylinder, a first end of said rod extending from said cylinder, the amount of extension of said rod being determined by the amount of fluid within said cylinder, said first end of said rod being coupled to its respective cowl portion at a location spaced from the hinge attachment location of said cowl portion.

7. In an aircraft having a jet engine, said engine having an annular cowl covering at least a portion of said engine, said cowl being longitudinally bifurcated to form first and second cowl portions, each of said cowl portions being hingedly attached to said engine for swinging movement of each of said cowl portions between a first position in which said cowl portions are joined together and a second position in which said cowl portions are spaced from said engine to expose said portion of said engine, an apparatus for moving said cowl portions between their respective first and second positions comprising:

a first linear hydraulic actuator associated with said engine and said first cowl portion and operable to move said first cowl portion from its first position to its second position;

a second linear hydraulic actuator associated with said engine and said second cowl portion and operable to move said second cowl portion from its first position to its second position;

hydraulic fluid reservoir means mounted on said engine for supplying hydraulic fluid to said actuators;

hydraulic pump means mounted on said engine, said pump means having a suction and an exhaust, said suction being in fluid communication with said reservoir means and said exhaust being in fluid communication with hydraulic control means;

said hydraulic control means associated with said reservoir means and said actuators and selectively operable to direct fluid from said reservoir means to said actuators to operate said actuators, said hydraulic control means including first valve means having a valve body including an inlet port coupled to the exhaust of said pump means, a service port coupled to said first actuator and an exhaust port, said first valve means further including a spool movable within said valve body, said spool having first and second lands thereon, said spool being movable between a first position in which said first land blocks said inlet port and a second position in which said second land blocks said exhaust port; second valve means having a valve body including an inlet port coupled to the exhaust of said hydraulic pump means, a service port coupled to said second hydraulic actuator, and an exhaust port, said second valve means further including a spool slidably mounted within said valve body, said spool having a first and a second land formed thereon, said spool being movable between a first position in which said first land blocks said inlet port and a second position in which said second land blocks said exhaust port of said second valve means; third valve means including a valve body having an inlet port formed therein coupled to the exhaust port of said first and second valve means and an exhaust port coupled to said reservoir means, said third valve means further including a spool slidably mounted within said body, said spool having a land formed thereon, said valve spool movable between a first position in which said land blocks said exhaust port of said third valve means and a second position in which said land is spaced from said exhaust port of said third valve means.

8. The cowl moving apparatus of claim 7 wherein said hydraulic control means further includes a first check valve in fluid communication with the exhaust port of said first valve means, operable to allow the passage of fluid from said exhaust port of said first valve means to the inlet port of said third valve means; and second check valve means fluidly coupled to said exhaust port of said second valve means and operable to permit passage of fluid from the exhaust port of said second valve means to the inlet port of said third valve means.

* * * * *

UNITED STATES PATENT AND TRADEMARK OFFICE
CERTIFICATE OF CORRECTION

PATENT NO. : 4,399,966
DATED : August 23, 1983
INVENTOR(S) : Eric H. Crudden et al.

It is certified that error appears in the above-identified patent and that said Letters Patent is hereby corrected as shown below:

Column 1, line 64: "cowl" should be --cowl,--
Column 1, line 66: delete "to"
Column 2, line 9: "electrically-driven" should be --electrically driven--
Column 5, line 32: "D.C." should be --DC--
Column 5, line 44: insert --is-- before "released"
Column 7, line 24: "When" should be --While--
Column 8, line 36: "resistor" should be --restrictor--

Signed and Sealed this

Twelfth Day of June 1984

[SEAL]

*Attest:*

*Attesting Officer*

GERALD J. MOSSINGHOFF

*Commissioner of Patents and Trademarks*